3,465,080
THERAPEUTIC COMPOSITIONS CONTAINING
MORPHOLINOALKYLENE - INDOLES AND
METHODS OF ADMINISTERING SUCH IN
THE TREATMENT OF DEPRESSION
William Blythe Wright, Jr., Woodcliff Lake, N.J., assignor to American Cyanamid Company, Stamford, Conn., a corporation of Maine
No Drawing. Continuation-in-part of application Ser. No. 584,354, Oct. 5, 1966. This application Oct. 7, 1968, Ser. No. 765,689
Int. Cl. A61k 27/00; C07d 99/00
U.S. Cl. 424—248           10 Claims

ABSTRACT OF THE DISCLOSURE

This invention relates to compositions containing N-(morpholinoalkyl)-2-indolecarboxamides and methods of administering the same. The active components can be prepared by several methods such as reacting an indolecarboxylic acid chloride with an alkylenediamine. The N-(morpholinoalkyl)-2-indolecarboxamides are useful for their antidepressant properties.

---

This is a continuation-in-part of my application Ser. No. 584,354, filed Oct. 5, 1966, which in turn is a continuation-in-part of my application Ser. No. 542,758, filed Apr. 15, 1966, both are which are now abandoned.

This invention relates to new compositions of matter. More particularly, it relates to compositions containing as the active component N-(morpholinoalkyl)-2-indolecarboxamides and methods of administering the same.

The active component of the novel compositions of the present invention may be illustrated by the following formula:

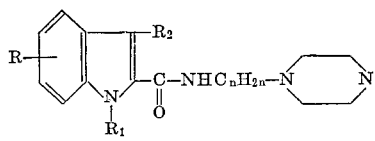

wherein R is selected from the group consisting of hydrogen, lower alkyl, halogen and trifluoromethyl; $R_1$ is selected from the group consisting of hydrogen, lower alkyl and allyl; $R_2$ is selected from the group consisting of hydrogen and lower alkyl; $n$ is an integer from 2 to 4; non-toxic acid addition salts and a pharmaceutically acceptable carrier. The term lower alkyl is intended to include those having 1 to 4 carbon atoms.

The free bases of the active components of this invention, in general, may be either liquids or solids at room tempertaure. The free bases are, in general, relatively insoluble in water, but soluble in most organic solvents such as lower alkyl alcohols and ether, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention may be prepared by the following method which has been found most desirable.

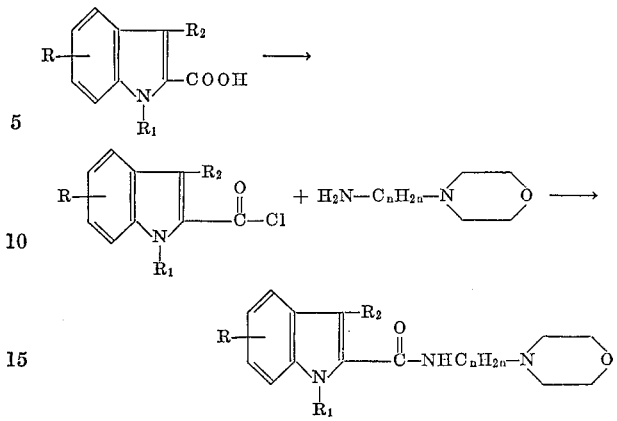

wherein R, $R_1$, $R_2$ and $n$ are as defined above.

In this process, the indole-2-carboxylic acid is reacted with a halogenating agent such as thionyl chloride in an inert solvent. The indole-2-carboxylic acid chloride is isolated and reacted with an alkylenediamine derivative. The products are recovered and purified by recrystallization from a suitable solvent. Alternatively, an ester or acid anhydride may be prepared as the intermediate.

The compounds of the present invention can also be prepared by other methods. One of these involves the preparation of a reactive indole-2-carboxamide as an intermediate followed by reaction with the alkylene diamine.

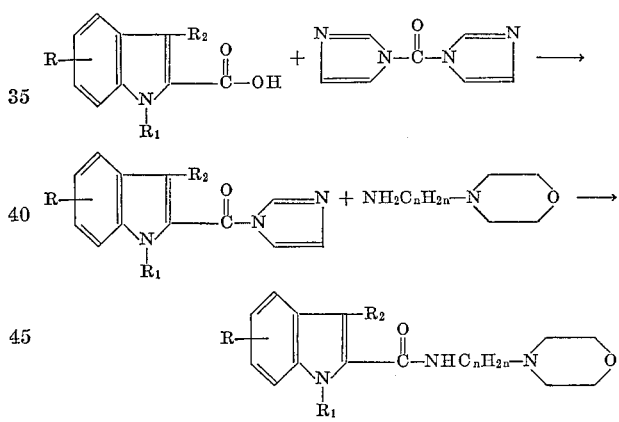

wherein R, $R_1$, $R_2$ and $n$ are as hereinbefore defined. This reaction is best carried out in two steps and tetrahydrofuran is a satisfactory solvent. A temperaure range of 25–75° C. is most desirable.

The anti-depressant properties of the compounds of the present invention are evident by measuring the ability to counteract in animals a depression induced by the administration of tetrabenazine hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. The following tests were carried out: Doses of 25 milligrams per kilogram of the test compounds are administered intraperitoneally to 5 mice one hour before the administration of tetrabenazine hexamate at a dose of 30 mg./kg. (intraperitoneal), which is known to depress markedly the exploratory behavior of normal mice. Thirty minutes later the mice are tested for their exploratory behavior. If 4 or more of 15 mice show exploratory behavior, then graded doses of the active test compounds are administered to additional groups of 5 mice. The antidepressant treated groups show normal exploratory behavior, while the control groups and groups treated with an ineffective anti-depressant agent, do not show this normal exploratory behavior, but show the well known, profound depression induced by tetrabenazine. The results from several dose levels are used to establish effective dose ranges. This method has been described by Greenblatt, E.N. and Osterberg, A.C. in Toxicology and Applied Pharmacology 7, pp. 566–578, (1965).

The results of the above testing on representative compounds are accurately summarized in Table I as follows:

TABLE I.—REVERSAL OF TETRABENZINE HEXAMATE DEPRESSION

| Compound | | Range of active doses (mg./kg.) intraperitoneal |
|---|---|---|
| I | 4-chloro-N-(2-morpholinoethyl)-2-indolecarboxamide hydrochloride. | 6.3–25 |
| II | 5-chloro-N-(2-morpholinoethyl)-2-indolecarboxamide hydrochloride. | 12.5–25 |
| III | 5-bromo-N-(2-morpholinoethyl)-2-indolecarboxamide hydrochloride. | 12.5–25 |
| IV | 6-chloro-N-(2-morpholinoethyl)-2-indoe-carboxamide hydrochloride. | 3.1–25 |
| V | 6-chloro-N-(3-morpholinopropyl)-2-indolecarboxamide hydrochloride. | 6.3–25 |
| VI | N-(2-morpholinoethyl)-2-indolecarboxamide hydrochloride. | 3.1–25 |
| VII | N-(3-morpholinopropyl)-2-indolecarboxamide hydrochloride. | 12.5–25 |
| VIII | 1-methyl-N-(2-morpholinoethyl)-2-indolecarboxamide hydrochloride. | 12.5–25 |
| IX | 1-methyl-N-(3-morpholinopropyl)-2-indolecarboxamide hydrochloride. | 1.6–25 |

These compounds compare favorably with effective antidepressant drugs such as imipramine and amitryptyline when tested by the above techniques.

The N-(morpholinoalkyl)-2-indolecarboxamides may be administered to warm-blooded animals orally, or parenterally if desired, and when so administered, may be considered as an anti-depressant agent for therapeutically desirable treatment of depression in warm-blooded animals. The dosage regimen can be adjusted to provide optimum therapeutic response. Thus, for example, several doses may be administered daily, or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragees, capsules, suppositories, liquids, elixirs, emulsions, suspensions, syrups, chocolate, candy, wafers, chewing gum, or the like. Such compositions and preparations should contain at least 0.1% of active component. The percentage of the compositions and preparations, may, of course, be varied, and may conveniently be between 2% and 60% or more of the weight of the unit. The amount of active component in such therapeutically useful compositions or preparations is such that a suitable dosage of 1 mg. to 30 mg./kg./day will be obtained. Preferred compositions or preparations according to the present invention are prepared so that a dosage unit form contains between about 5 and about 100 milligrams of the N-(morpholinoalkyl)-2-indolecarboxamides.

The compositions of this invention are physiologically active as anti-depressants. As such, they can be incorporated in various pharmaceutical forms such as tablets, capsules, pills, and so forth, for immediate or sustained release, by combining with suitable pharmaceutical carriers. They may be in the form of dosage units for a single therapeutic dose or in small units for multiple dosages or in larger units for division into single doses. Obviously, in addition to the therapeutic anti-depressant compound there may be present excipients, binders, fillers, and other therapeutically inert ingredients necessary in the formulation of the desired pharmaceutical preparation.

The following specific examples illustrate the preparation of representative compounds of the present invention along with formulations of the active components. Parts are by weight unless otherwise indicated.

EXAMPLE 1

Preparation of 6-chloro-N-(2-morpholinoethyl)-2-indolecarboxamide

A mixture of 26 parts of 6-chloroindole-2-carboxylic acid, 500 parts of ether and 50 parts of thionyl chloride is stirred at room temperature for 8 hours and then concentrated to remove the solvent and excess thionyl chloride. The crystalline residue is crude 6-chloroindole-2-carbonyl chloride and is used in the next step without further purification.

A solution of 10.7 parts of the 6-chloroindole-2-carbonyl chloride in 100 parts of ether is added dropwise with stirring and cooling to a solution of 13 parts of N-(2-aminoethyl)-morpholine in 100 parts of ether. The mixture is allowed to stand at room temperature for 20 hours and then stirred with 50 parts of 2 N sodium hydroxide solution. The precipitate is filtered off and washed with water then with a little ether. Recrystallization from 300 parts by volume of ethanol results in 11.6 parts of 6-chloro-N-(2-morpholinoethyl) - 2 - indolecarboxamide, melting point 229°–231° C. The hydrochloride melts at 260–262° C.

EXAMPLE 2

Preparation of 6-chloro-N-(2-morpholinoethyl)-2-indolecarboxamide

A mixture of 11.2 parts of ethyl 6-chloroindole-2-carboxylate, 9 parts of N-(2-aminoethyl)morpholine and 0.2 part of sodium methylate is heated at 115°–125° C. for 2½ hours and cooled. The mixture is triturated with ether and filtered. The crystalline product is recrystallized from ethanol.

EXAMPLE 3

Preparation of 5-chloro-N-(2-morpholinoethyl)-2-indolecarboxamide

The above compound, melting point 218°–220° C., is obtained when 5-chloroindole-2-carboxylic acid is substituted for 6-chloroindole-2-carboxylic acid in the procedure of Example 1. The hydrochloride salt melts at 263–265° C.

EXAMPLE 4

Preparation of 4-chloro-N-(2-morpholinoethyl)-2-indolecarboxamide

When 4-chloroindole-2-carboxylic acid is substituted for 6-chloroindole-2-carboxylic acid in the procedure of Example 1, the above compound, melting point 212°–214° C. is obtained. The hydrochloride melts at 219–221° C.

EXAMPLE 5

Preparation of 5-bromo-N-(2-morpholinoethyl)-2-indolecarboxamide

If 5-bromoindole-2-carboxylic acid is substituted for 6-chloroindole-2-carboxylic acid in the procedure of Example 1, the above compound, melting point 233°–235° C., is obtained. The hydrochloride melts at 276–278° C.

EXAMPLE 6

Preparation of 6-fluoro-N-(2-morpholinoethyl)-2-indolecarbonamide

The compound is obtained when 6-fluoroindole-2-carbonyl chloride is reacted with N-(2-aminoethyl)morpholine by the procedure of Example 1.

EXAMPLE 7

Preparation of N-(2-morpholinoethyl)-6-trifluoromethyl-2-indole carboxamide

When 6-trifluoromethylindole-2-carbonyl chloride is reacted with N-(2-aminoethyl)morpholine by the procedure of Example 1, this compound is obtained.

EXAMPLE 8

Preparation of 6-chloro-1,3-dimethyl-N-(2-morpholinoethyl)-2-indolecarboxamide

This compound is obtained when 6-chloro-1,3-dimethyl-2-indolecarbonyl chloride is substituted for 6-chloroindole-2-carbonyl chloride in the procedure of Example 1.

EXAMPLE 9

Preparation of 6-chloro-N-(2-morpholinopropyl)-2-indolecarboxamide

If 2-morpholinopropylamine is substituted for N-(2-aminoethyl)morpholine in the procedure of Example 1, this compound is obtained.

EXAMPLE 10

Preparation of 6-chloro-N-(1-methyl-2-morpholinoethyl)-2-indolecarboxamide

By reacting 6-chloroindole-2-carbonyl chloride with N-(2-aminopropyl)morpholine by the procedure of Example 1, this compound is obtained.

EXAMPLE 11

Preparation of 6-chloro-N-(4-morpholinobutyl)-2-indolecarboxamide

The above compound is obtained when N-(4-aminobutyl)morpholine is substituted for N-(2-aminoethyl)morpholine in the procedure of Example 1.

EXAMPLE 12

Preparation of 6-chloro-N-(3-morpholinopropyl)-2-indolecarboxamide

A solution of 3 parts of 6-chloroindole-2-carbonyl chloride in 30 parts of ether is added with cooling and stirring to a mixture of 3.5 parts of 3-bromopropylamine hydrobromide, 5.3 parts of sodium carbonate, 25 parts of water and 100 parts of ether. The mixture is shaken at intervals, left for 20 hours at room temperature and then diluted with 25 parts of water and filtered. The insoluble portion is washed with water and ether and then melts at 173°–175° C. This is N-(3-bromopropyl)-6-chloroindole-2-carboxamide.

A mixture of 0.8 parts of N-(3-bromopropyl)-6-chloro-indole-2-carboxamide, 2 parts of morpholine and 25 parts of benzene is heated on the steam bath for 4 hours and then concentrated to remove the solvent. The residue is triturated with 5 parts of 1 N sodium hydroxide and filtered. The precipitate is washed with water and dried. The 6-chloro-N-(3-morpholinopropyl) - 2 - indolecarboxamide melts at 204°–206° C. The hydrochloride melts at 217–219° C.

EXAMPLE 13

Preparation of 5-bromo-N(3-morpholinopropyl)-2-indolecarboxamide

This compound, melting point 224°–226° C., is obtained when 5-bromoindole-2-carbonyl chloride is reacted with N-(3-aminopropyl)morpholine by the procedure of Example 1.

EXAMPLE 14

Preparation of 6-chloro-N-[2-(2,6-dimethylmorpholino)-ethyl]-2-indolecarboxamide A solution of 10 parts of 6-chloroindole-2-carbonyl chloride in 100 parts of ether is added with cooling and stirring to a mixture of 11 parts of 2-bromoethylamine hydrobromide, 19 parts of sodium carbonate, 300 parts of ether and 100 parts of water. The mixture is shaken at intervals, left at room temperature for 20 hours, and the layers are separated. The ether layer is washed with water and concentrated. The solid residue is washed out with water and dried. This is crude N-(2-bromoethyl)-6-chloroindole-2-carboxamide.

A mixture of 1.5 parts of the N-(2-bromoethyl)-6-chloroindole-2-carboxamide, 2 parts of 2,6-dimethylmorpholine and 2.5 parts of benzene is heated on the steam bath for 4 hours. The mixture is cooled and 8 parts of 1 N sodium hydroxide and 75 parts of benzene are added. The layers are separated and the benzene layer is washed with water and concentrated. The solid residue is recrystallized from ethyl acetate. The 6-chloro-N-[2-2,6-dimethylmorpholino)ethyl]-2-indolecarboxamide melts at 170°–171° C.

EXAMPLE 15

Preparation of 6-chloro-N-[2-(2-methylmorpholino)-ethyl]-2-indolecarboxamide

When 2-methylmorpholine is substituted for 2,6-dimethylmorpholine in the procedure of Example 14, this compound is obtained.

EXAMPLE 16

Preparation of 1-allyl-N-(2-morpholinoethyl)-2-indolecarboxamide

The above compound is obtained when 1-allyl-2-carbonyl chloride is reacted with N-(2-aminoethyl)morpholine by the procedure of Example 1.

EXAMPLE 17

Preparation of 1-ethyl-N-(2-morpholinoethyl)-2-indolecarboxamide

The above compound is obtained when 1-ethyl-2-indolecarbonyl chloride is reacted with N-(2-aminoethyl)-morpholine using the procedure of Example 1.

EXAMPLE 18

Preparation of 1-methyl-N-(3-morpholinopropyl)-2-indolecarboxamide hydrochloride If 1-methyl-2-indolecarbonyl chloride is reacted with N-(3-aminopropyl)morpholine by the procedure of Example 1, this compound, melting point 198–200° C., is obtained.

EXAMPLE 19

Preparation of N-(2-morpholinoethyl)-2-indolecarboxamide hydrochloride

This compound, melting point 236–238° C., is obtained when indole-2-carboxylic acid is substituted for 6-chloroindole-2-carboxylic acid in the procedure of Example 1.

EXAMPLE 20

Preparation of N-(3-morpholinopropyl)-2-indolecarboxamide hydrochloride

When indole-2-carbonyl chloride is reacted with N-(3-aminopropyl)morpholine by the procedure of Example 1, the above compound, melting point 200–202° C., is obtained.

EXAMPLE 21

Preparation of 6-methyl-N-(2-morpholinoethyl)-2-indolecarboxamide

When 6-methylindole -2-carboxylic acid is substituted for 6-chloroindole-2-carboxylic acid in the procedure of Example 1, the above compound is obtained.

EXAMPLE 22

Preparation of 1-methyl-N-(2-morpholinoethyl)-2-indolecarboxamide hydrochloride

If 1-methylindole-2-carboxylic acid is substituted for 6-chloroindole-2-carboxylic acid in the procedure of Example 1, the above compound, melting point 189–191° C., is prepared.

EXAMPLE 23

Preparation of 4-ethyl-N-(2-morpholinoethyl)-2-indolecarboxamide

The above compound is obtained when 4-ethylindole-2-carboxylic acid is substituted for 6-chloroindole-2-carboxylic acid in the procedure of Example 1.

EXAMPLE 24

The present compounds can be dispensed in dosage unit forms such as hard shell capsules or soft shell capsules. A formulation found useful in the preparation of such capsules is as follows:

| | Grams |
|---|---|
| 4-chloro-N-(2-morpholinoethyl)-2-indolecarboxamide hydrochloride | 20.00 |
| Lactose, U.S.P. | 3,000.00 |
| Magnesium stearate (0.5%) | 31.25 |
| | 3,051.25 |

The formulation is thoroughly mixed and placed as equal quantities in 1000 capsules.

EXAMPLE 25

The following example represents a formulation useful in preparing tablets. These tablets can be prepared with sufficient active ingredients for a portion of one days' use. Larger tablets can be scored and divided into halves or quantities to be given one to four times a day. Obviously also smaller tablets can be used in multiple doses to obtain the daily amount of active material. The following formulation has been useful.

| | Mg. |
|---|---|
| 6-chloro-N-(2-morpholinoethyl)-2-indolecarboxamide hydrochloride | 20 |
| Corn starch | 210 |
| Methyl cellulose 400 | 350 |
| Magnesium stearate 1% | 182 |
| Total | 762 |

The above tablet contains 20 mg. of drug which is usually given several times a day.

EXAMPLE 26

The active components of the present invention can also be given in the form of tablets made by other formulations such as the following:

| | Per tablet, gram |
|---|---|
| N-(2-morpholinoethyl)-2-indolecarboxamide hydrochloride | 0.05 |
| Corn starch | 0.3 |
| Ethyl cellulose | 0.005 |
| Magnesium stearate | 0.0016 |
| Total | .3566 |

The above formulation can be varied by increasing or decreasing the corn starch and by the addition of other ingredients. Also, other disintegrating agents, such as potato starch, may be used in place of corn starch. Other lubricants such as stearic acid, talc and the like can be used. Sweetening agents such as saccharin or sodium cyclohexyl sulfamate and flavoring such as peppermint oil, oil of wintergreen, orange or cherry can be used.

EXAMPLE 27

The active components of the present invention can be given intramuscularly or subcutaneously in the following formulation:

| | |
|---|---|
| 1-methyl-N-(3-morpholinopropyl)-2-indolecarboxamide hydrochloride mg | 1,250 |
| Sodium carboxymethylcellulose mg | 10 |
| Sodium chloride mg | 9 |
| Tween 80 mg | 1 |
| Benzyl alcohol mg | 9 |
| Sterile water to make ml | 50 |

This preparation will contain 25 mg./ml. of the active compound.

EXAMPLE 28

The active components of the present invention can be given parenterally in the form of parenteral suspensions such as the following:

| | |
|---|---|
| 6-chloro-N-(3-morpholinopropyl)-2-indolecarboxamide gms | 2.0–5.0 |
| Polysorbitan 80 gms | 0.1–0.2 |
| Polyethylene glycol 4000 gms | 2.0–5.0 |
| Sodium chloride U.S.P. gms | 0.5–0.8 |
| Benzyl alcohol gms | 0.9 |
| Pyrogen-free distilled water to make ml | 100.0 |

Each milliliter contains from 20 mg. to 50 mg. of drug. Obviously, other ingredients can be used in place of the above to prepare desired suspensions. For example, as surfactants in place of polysorbitan 80, ethylene oxide or polyoxypropylene base can be used, and other suspending agents such as carboxymethylcellulose, methylcellulose and gelatin can be used. Other salts than sodium chloride can be used such as sodium phosphates. While benzyl alcohol is a desirable preservative, others can be used such as parabens, chlorobutanol, etc. Also, in place of polyethylene glycol 4000, other vehicles can be used such as polyethylene glycol 400.

What is claimed is:

1. A therapeutic composition for the treatment of depression comprising as an essential active ingredient between about 5 and 100 milligrams per dosage unit of an N-(morpholinoalkyl)2-indolecarboxamide of the formula:

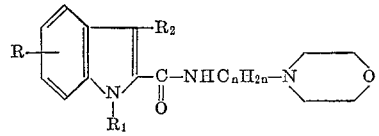

wherein R is selected from the group consisting of hydrogen, lower alkyl, halogen and trifluoromethyl; $R_1$ is selected from the group consisting of hydrogen, lower alkyl and allyl; $R_2$ is selected from the group consisting of hydrogen and lower alkyl; $n$ is an integer from 2 to 4 and non-toxic acid addition salts thereof, and a pharmaceutically acceptable carrier therefor.

2. A composition according to claim 1, in which the N-(morpholinoalkyl)-2-indolecarboxamide is 6-chloro-N-(3-morpholinopropyl)-2-indolecarboxamide.

3. A composition according to claim 1, in which the N-(morpholinoalkyl)-2-indolecarboxamide is 6-chloro-N-(2-morpholinoethyl)-2-indolecarboxamide.

4. A composition according o claim 1, in which the N-(morpholinoalkyl)-2-indolecarboxamide is 1-methyl-N-(3-morpholinopropyl)-2-indolecarboxamide.

5. A composition according to claim 1, in which the N-(morpholinoalkyl)-2-indolecarboxamide is N-(2-morpholinoethyl)-2-indolecarboxamide.

6. The process of treating depression in warm-blooded animals which comprises administering internally to warm-blooded animals a composition containing between about 5 and 100 milligrams per dosage unit of a compound selected from the group consisting of N-(morpholinoalkyl)-2-indolecarboxamides of the formula:

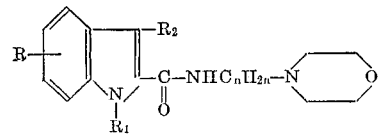

wherein R is selected from the group consisting of hydrogen, lower alkyl, halogen and trifluoromethyl; $R_1$ is selected from the group consisting of hydrogen, lower alkyl and allyl; $R_2$ is selected from the group consisting of hydrogen and lower alkyl; $n$ is an integer from 2 to 4 and non-toxic acid addition salts thereof, and a pharmaceutically carrier therefor.

7. The process according to claim 6, in which the N-(morpholinoalkyl)-2-indolecarboxamide is 6-chloro-N-(3-morpholinopropyl)-2-indolecarboxamide.

8. The process according to claim 6, in which the N-morpholinoalkyl)-2-indolecarboxamide is 6-chloro-N-(2-morpholinoethyl)-2-indolecarboxamide.

9. The process according to claim 6, in which the N-(morpholinoalkyl)-2-indolecarboxamide is 1-methyl-N-(3-morpholinopropyl)-2-indolecarboxamide.

10. The process according to claim 6, in which the N-(morpholinoalkyl)-2-indolecarboxamide is N-(2-morpholinoethyl)-2-indolecarboxamide.

References Cited

UNITED STATES PATENTS 3,346,453   10/1967   Holm _____ 424—248

ALBERT T. MEYERS, Primary Examiner

STANLEY J. FRIEDMAN, Assistant Examiner.

U.S. Cl. X.R.

260—247.2